United States Patent [19]
Borre et al.

[11] Patent Number: 4,741,841
[45] Date of Patent: May 3, 1988

[54] METHOD AND APPARATUS FOR PARTICLE SEPARATION

[75] Inventors: Earl A. Borre, Itasca; James F. Zievers, LaGrange; Henry Schmidt, Jr., Hinsdale, all of Ill.

[73] Assignee: Industrial Filter & Pump Mfg. Co., Cicero, Ill.

[21] Appl. No.: 874,437

[22] Filed: Jun. 16, 1986

[51] Int. Cl.[4] .............................................. B01D 35/20
[52] U.S. Cl. ..................................... 210/785; 210/805; 210/323.2; 210/332; 210/388; 210/439; 55/304
[58] Field of Search ..................... 210/323.2, 332, 388, 210/437, 438, 439, 484, 780, 785, 805; 55/300, 304; 209/250, 269, 285, 287, 301, 302, 379, 381, 382

[56] References Cited

U.S. PATENT DOCUMENTS

| | | | |
|---|---|---|---|
| 2,501,916 | 3/1950 | Rantaniemi | 209/269 |
| 2,668,624 | 2/1954 | Wahlin | 210/484 |
| 3,272,336 | 9/1966 | Humbert | 210/439 |
| 3,679,052 | 7/1972 | Asper | 210/777 |
| 3,704,223 | 11/1972 | Dietzsch et al. | 210/321.5 |
| 3,744,633 | 7/1973 | Schmidt, Jr. et al. | 210/785 |
| 3,768,660 | 10/1973 | Block | 210/321.1 |
| 4,289,630 | 9/1981 | Schmidt, Jr. et al. | 210/323.2 |

Primary Examiner—David Sadowski
Assistant Examiner—Richard D. Jordan
Attorney, Agent, or Firm—Edmond T. Patnaude

[57] ABSTRACT

Particulates which are less than and greater than a predetermined size and are entrained in a fluid are separated according to their respective sizes by passing the fluid and entrained particulates through a porous, crossflow separator element while continuously vibrating the separator element to prevent buildup of particulates on the upstream side of the separator element.

16 Claims, 2 Drawing Sheets

METHOD AND APPARATUS FOR PARTICLE SEPARATION

The present invention relates in general to cross-flow separation of particulates entrained in a fluid according to the size of the particulates, and it relates more particularly to a new and improved separation method and apparatus wherein a perforate filter medium is continuously vibrated as the fluid travels at a high velocity across the upstream surface of the medium in a direction transverse to the flow of fluid through the medium.

BACKGROUND OF THE INVENTION

Cross-flow filtration wherein a fluid is caused to flow parallel to the upsteam side of the filter surface has been used for many applications where a quasi-steady operation is desirable. With cross-flow filtration the build up of the solids on the upstream surface of the filter medium is inhibited by the shear exerted by the flowing fluid. This type of filtration has been largely restricted to microfiltration and membrane filtration.

In order to use filtration to separate entrained particulates of less than a predetermined size from entrained particles of a larger size it is necessary to maintain the pore size of the filter medium constant. With through-flow filters wherein the fluid flow is normal to the surface of the filter medium, the filter cake effectively decreases the pore size of the filter medium wherefore the maximum particle size which passes through the filter medium increases from a maximum value when a filter cycle is initiated to a minimum value when the filter cycle is terminated for filter cake removal. While the build up of a filter cake is inhibited and in some cases entirely prevented when cross-flow filtration is employed, some of the fine particles which will not entirely pass through the filter medium do enter the wall matrix of the filter medium and remain within the medium. As a consequence, the maximum particle size which will pass through the filter medium in a cross-flow filter also decreases as the filter cycle continues.

SUMMARY OF THE INVENTION

Briefly, the present invention provides a new and improved method and apparatus which uses cross-flow filtration for separating solids entrained in a fluid according to the size of the particles relative to a predetermined size. In accordance with one aspect of the invention, means are provided for increasing the fluid velocity across the upstream surface of the filter medium to increase the turbulence at the surface of the filter medium, and in accordance with another feature of the invention the filter medium is continuously vibrated to prevent the entrained particles which can pass into the outer wall of the filter medium from being retained therein. A further benefit which is achieved by the combination of high velocity and continuous vibrations is a more uniform flow through the entire filter medium and a more efficient operation of the system.

In accordance with another feature of the invention there is provided a new and improved vibratory filter and novel means for sealing an externally mounted vibrator to the filter chamber.

GENERAL DESCRIPTION OF THE DRAWING

The present invention will be better understood by a reading of the following detailed description taken in connection with the accompanying drawing wherein.

DETAILED DESCRIPTION OF A PREFERRED EMBODIMENT OF THE PRESENT INVENTION

Figure 1:
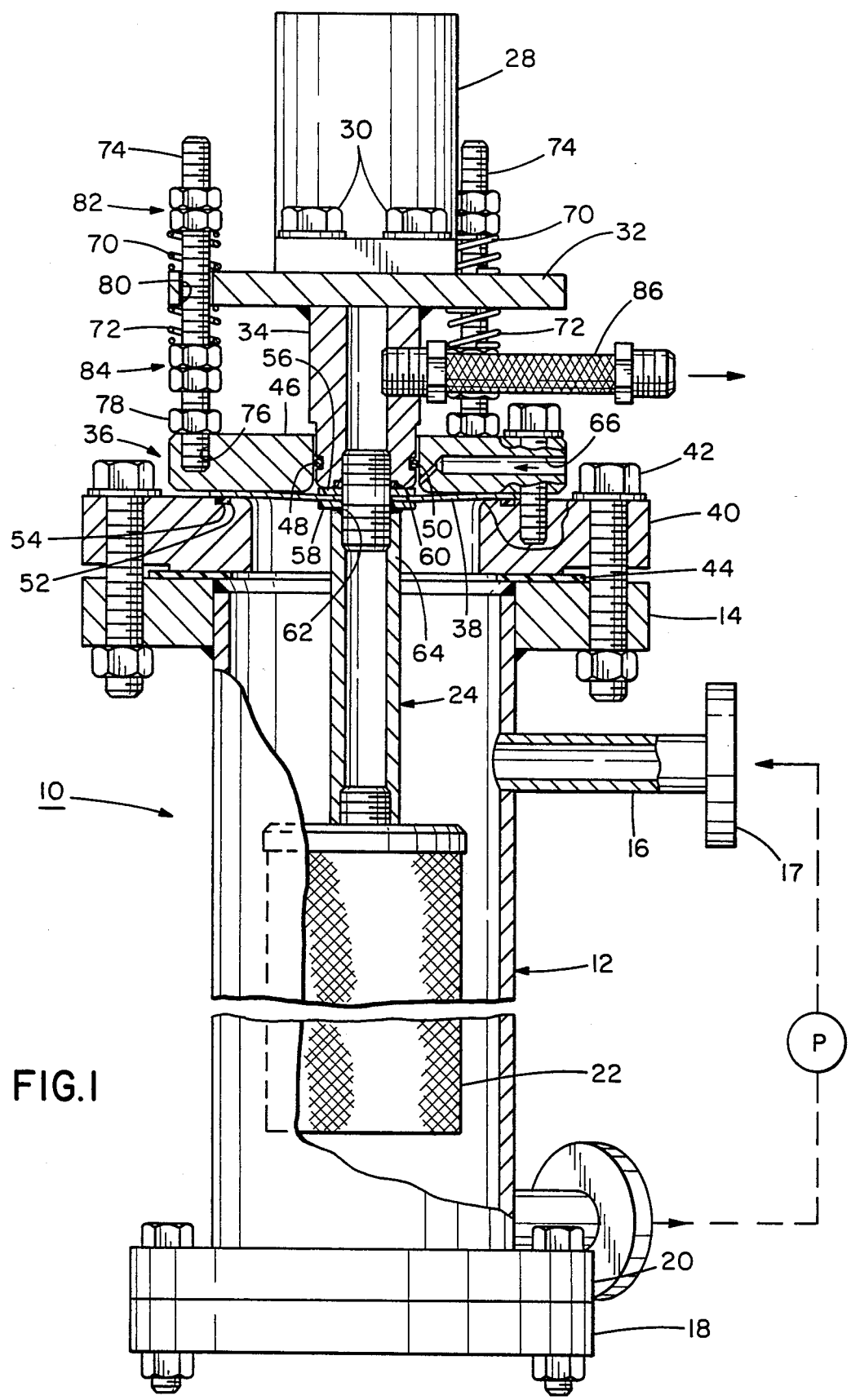
FIG. 1 is a partially cross-sectioned elevational view of a particle separator embodying the present invention.

Referring to FIG. 1, there is shown a fragmentary view of a particle separator 10 which includes a hollow cylindrical tank 12 having annular flange member 14 suitably welded to the top thereof. An inlet port 16 including a mounting flange 17 opens into the tank 12 near the top thereof and the bottom is suitably sealed by a bottom drain cover member 18 which is removably attached to a flange 20 welded to the bottom of the tank 12. An auxiliary output is provided at the bottom of the tank 12 and, as shown is connected through a pump P to inlet 16 so that a portion of the unseparated fluid is recirculated through the tank 12 to increase the velocity of fluid through the tank.

A tubular porous separator element 22 is mounted concentrically within the housing tube 12 by means of a tubular outlet assembly 24 through which the filtered effluent passes on its way to an outlet conduit 86. The separator tube 22 is rigid in the vertical direction and may be of a construction like that shown in U.S. Pat. No. 4,526,688. A suitable vibratory impactor 28 such as that shown in U.S. Pat. No. 3,212,643 is fixedly mounted by means of a plurality of screws 30 to a rigid plate 32 which is affixed as by welding to a rigid tubular member 34 which forms a part of the outlet assembly 24. The vibrator 28 imparts vertically directed shock waves to the tube 34, and inasmuch as the outlet assembly 24 is rigid, being formed of metal, operation of the vibratory impactor 28 causes the separator element 22 to be vibrated in a direction parallel to its longitudinal axis. For some applications it would be preferable to mount the vibratory impactor within the filter tank. U.S. Pat. No. 4,289,630 assigned to the assignee of the present application discloses a suitable way to mount the vibratory impactor within the tank 12.

The separator element 22 is located in its entirety below the location where the inlet conduit 16 opens into the chamber within the housing 12 wherefore the direction of fluid flow is down through the restricted annular area between the external cylindrical surface of the filter element 22 and the internal cylindrical surface of the tank 12. It may be seen, therefore, that the general flow of fluid is in a direction parallel to the external, upstream cylindrical surface of the separator element 22. The pressure within the element 22 is less than the pressure in the tank 12 and the fluid and any entrained particles which pass through the separator element 22 pass upwardly through the outlet assembly 24 into the outlet tube 86.

In order to seal the top of the tank 12 from the ambient while transmitting vertically directed shock waves from the impactor 28 to the separator element 22 there is provided a cover assembly 36 which includes a diaphragm 38. More particularly, the cover assembly 36 includes an annular cover plate 40 which is removably attached by a plurality of bolts 42 to the flange 14 and which is sealed to the flange 14 by means of an annular gasket 44 which is sandwiched between the flange 14 and the cover plate 40. The peripheral portion of the diaphragm 38 is sandwiched between the cover plate 40 and an annular mounting ring 46 through which the member 34 extends, and the top of the diaphragm 38 is sealed from the ambient by means of an O-ring 48 which is received in an annular groove 50 in the tubular member 34 and is compressed between the member 34 and the inner radial wall of the ring 46. The diaphragm 38 is preferably formed of a flexible metallic material and its bottom surface is sealed to the cover member 40 by means of an O-ring gasket 52 which is received in an annular groove 54 in the top surface of the cover member 40 and which is compressed between the cover member 40 and the lower surface of the outer annular portion of the diaphragm 38. The inner annular portion of the diaphragm 38 is compressed between a pair of washers 56 and 58. An annular O-ring 60 is compressed between the washer 56 and the lower face of the member 34 to seal the upper surface of the washer 56 from the passageway through the outlet assembly and a gasket 62 is compressed between the upper end of a rigid spacer element 64 and the washer 58.

In order to reduce the differential pressure across the diaphragm 38 and thereby increase its life, a pressure equalization port 66 extends through the collar 46 and opens into the annular space between the top of the diaphragm 38 and the O-ring gasket 48. In normal operation the equalizer passage may be connected to the chamber in the tank 12 so as to be pressurized at a pressure substantially equal to the pressure within the tank 12, thereby equalizing the pressures on the two sides of the diaphragm. Alternatively, other means for applying gas to the port 66 at a pressure equal to the pressure in the tank 12 may be used.

The vibratory impactor 28 and the plate on which it is fixedly supported are mounted between a plurality of pairs of springs 70 and 72 so that the vibratory impactor 28, the outlet assembly 24 and the separator element 22 constitute a single rigid element which upon operation of the impactor 28 freely vibrates in a vertical direction between the spring pairs 70 and 72. In a preferred embodiment of the invention there are three such pairs of symmetrically arranged springs which maintain the plate 32 on center with the principal longitudinal axis of the member 34 and the separator element 22.

Considered in greater detail, three studs 74, only two of which are shown in the drawing, are threaded at the bottom into suitably threaded symmetrically disposed blind holes 76 in the collar 46 and are held in place thereon by respective ones of a plurality of nuts 78. The stud 74 extends through vertically disposed holes 80 in the support plate 32 with the springs 70 and 72 being respectively compressed between the top and bottom surfaces of the plate 32 and two sets of adjustment nuts 82 and 84. The nuts 82 and 84 can be used to adjust the compression of the springs 70 and 72 to fine tune the amplitude of the vibrations applied to the separator element 22.

Figure 2:
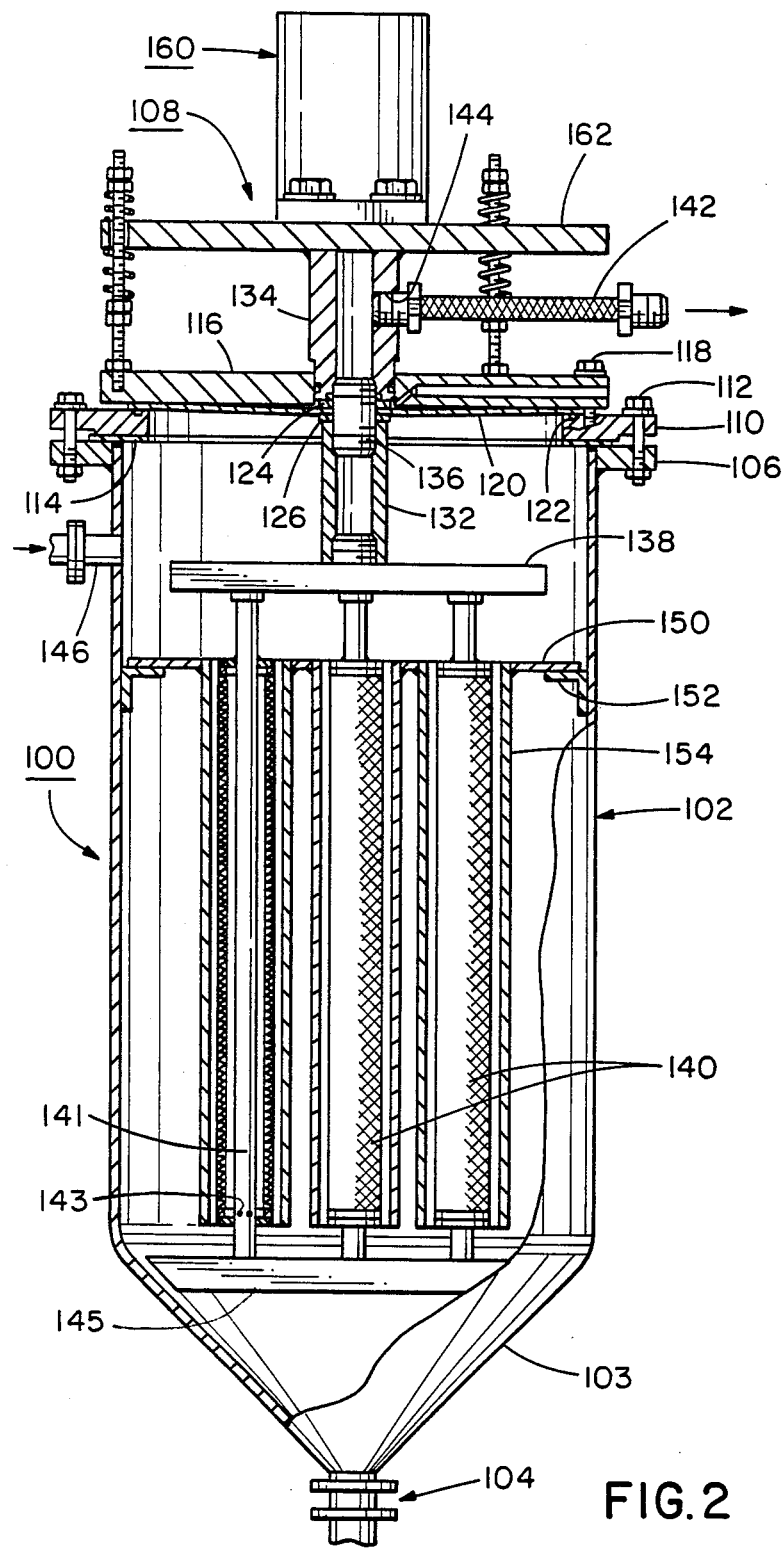
FIG. 2 is a partially cross-sectioned elevational view of another particle separator embodying the present invention.

Referring to FIG. 2 there is shown a particle separator 100 comprising a generally cylindrical tank 102 having a tapered bottom 103 terminating at its lower end in a drain valve assembly 104. An annular mounting flange 106 is suitably welded to the top of the tank 102. A vibratory cover and outlet assembly 108 is mounted over the top of the tank 102 and includes an annular mounting ring 110 which is bolted to the flange 106 by a plurality of nut and bolt assemblies 112. An annular sealing gasket 114 is compressed between the mounting flange 106 and the plate 110 to seal the junction therebetween.

A cover plate 116 is secured to the mounting plate 110 by a plurality of nut and bolt assemblies 118 and a flexible diaphragm 120, which may be formed of metal, is positioned between the annular plate 110 and the cover plate 116. An annular sealing gasket 122 is compressed between the bottom surface of the diaphgram 120 near the periphery thereof and the mounting ring 110. The upper surface of the diaphragm 120 is tightly compressed against the lower face of the cover plate 116 to effect a seal therebetween. The inner annular portion of the diaphragm 120 is tightly compressed between a pair of rings 124 and 126 which are in turn sandwiched between the upper and lower ends of a pair of rigid outlet pipes 132 and 134. The pipes 132 and 134 are rigidly connected together by a rigid conduit 136 which is externally threaded at its upper and lower ends and which are in turn received in internally threaded bores of the conduits 132 and 134. A rigid, tubular manifold 138 is threadedly connected at the top to the lower end of the conduit 132 and a plurality of perforate tubular separator elements 140 are rigidly connected to the rigid manifold 138 with the interior of the separator elements 140 being in communication with the manifold 138 via a tube 141 and thus with the outlet conduits 132 and 134. The tube 141 is fixedly sealed at the top and bottom to the perforate shell of the element 140 and is provided near the bottom of the shell with inlet openings 143 through which the effluent enters the tube 141. The tubes 141 are sealed at the bottom and affixed to a spacer 145 which thus holds the bottom of the elements 140 in spaced parallel relationship. An outlet tube 142, which is preferably flexible or connected to a flexible conduit, is threadedly received in a bore 144 in the side wall of the upper outlet tube 134. The fluid containing the particulates to be separated is supplied to the chamber within the tank 102 through an inlet port 146 and flows through the separator tubes 140 into the interiors thereof from which it flows into the manifold 138 and thus through the outlet conduits 132 and 134 and out of the unit through the outlet conduit 142.

In order to provide for the flow of fluid across the external upstream surfaces of the separator tubes 140 in a direction parallel to those surfaces and thus normal to the flow through the perforate surfaces thereof, a circular plate 150 rests on an annular ledge 152 mounted to the internal wall of the tank 102 in proximity to the upper surfaces of the perforate portions of the filter elements 140. The plate 150 has a plurality of holes in which the upper ends of a plurality of flow control imperforate tubes 154 are positioned. The tubes 154 are welded to the plate 150 and depend therefrom with the lower ends of the tubes 154 being in proximity to the lower ends of the seperator elements 140. Consequently, the flow of fluid is through the inlet port 146 into the portion of the chamber above the separator elements and down through the annular spaces surrounding the individual separator elements and then through the walls of the separator elements into the internal cavities therein from whence it flows up through the manifold 138 and out through the exhaust conduit 142.

A vibratory impactor 160 which may be identical to the vibratory impactor 28 shown in FIG. 1 is mounted to a vibrator support plate 162 which is in turn welded to the top of the outlet tube 134. The plate 162 and the vibrator 160 which is mounted to it are mounted between a plurality of springs like those which mount the vibrator 28 and mounting plate 32 in the embodiment of FIG. 1.

Figure 3:
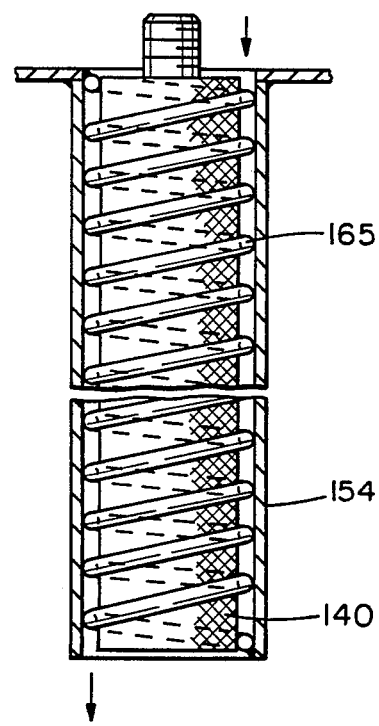
FIG. 3 is a partially cross-sectioned elevational view of a particle separator element embodying another feature of the present invention.

Referring to FIG. 3, there is shown an alternative embodiment of the invention wherein the velocity of the fluid across the surface of the separator element 140 is increased. In this embodiment of the invention a spiral member 165 is tightly fitted into the flow control tube 154 and the separator element 140 is tightly fitted within the spiral member 165. In order to hold the spiral member 165 in place within the flow control tube 154, it is welded at its top and bottom to the internal surface of the tube 154 as shown in FIG. 3. With this construction it may be seen that the flow of fluid down through the space surrounding the separator element 140 is in a spiral direction and is parallel to the external cylindrical surface of the separator element 140. The use of a helical velocity acclerating member may be used in both of the embodiments of the invention shown in FIG. 1 and in FIG. 2. When used with the embodiment of FIG. 1 the helical member can be mounted directly to the internal surface of the tank 12 in a location surrounding the separator element 122.

It may thus be seen that the present invention provides a method and apparatus for separating particulates entrained in either a gas or liquid fluid by causing the fluid to pass across the surface of a filter-like separator element at a high velocity while continuously vibrating the separtor element in a direction generally parallel to the flow of fluid across the upstream surface of the separator element. The size of the pores through the separator element will depend, of course, on the size of the particles which are to be separated from the fluid and from the larger size particles also entrained in the fluid. The invention also provides for the use of a plurality of flow control tubes within a multiple tube separator as well as for the use of a direction control element which causes the fluid to travel in a spiral direction around the surface of a tubular separator element.

While the present invention has been described in connection with particular embodiments thereof, it will be understood by those skilled in the art that many changes and modifications may be made without departing from the true spirit and scope of the present invention. Therefore, it is intended by the appended claims to cover all such changes and modifications which come within the true spirit and scope of this invention.

What is claimed:

1. Separation apparatus, comprising in combination
a filter tank enclosing a filter chamber,
a hollow perforate, tubular filter element disposed in said chamber,
said filter element having an upstream surface,
means including a tubular imperforate member spaced from and in proximity to said upstream surface for directing a flow of fluid and entrained particles across said upstream surface in a direction generally parallel thereto,
means for continuously vibrating said filter element while said fluid and entrained particles flow across said upstream surface, and
a helical spacer element positioned between said filter element and said imperforate member in contact with said filter element and said imperforate member.

2. Separation apparatus according to claim 1 wherein said helical spacer element is a spring, the end portions of said spring being affixed to said imperforate member.

3. Separation apparatus comprising in combination
a filter tank enclosing a sealed filter chamber,
a fluid inlet to said chamber,
a tube sheet extending across said chamber and mounted to said tank,
a plurality of imperforate tubes sealably secured over respective ones of a plurality of openings in said sheet and extending a substantial distance from one face of said sheet in mutually parallel relationship,
a plurality of tubular filter elements extending into said tubes in concentric spaced relationship therewith,
a tubular outlet manifold,
said filter elements being connected at one end to said manifold, and
vibratory means connected to said manifold for vibrating said manifold and said filter elements in a direction parallel to the longitudinal axes of said filter elements.

4. Separation apparatus according to claim 3 wherein
said tube sheet is horizontally disposed and separates said filter chamber into upper and lower sections,
said outlet manifold is located above said tube sheet, and
said imperforate tubes depend from said tube sheet into said lower section.

5. Separation apparatus according to claim 4 wherein said imperforate tubes are each provided with a top end and a bottom end and are open at the bottom ends.

6. Separation apparatus according to claim 5 wherein each of said imperforate tubes has a lower end which is no higher than the bottom ends of the respectively associated filter elements.

7. Separation apparatus according to claim 5 wherein said fluid inlet opens into said upper section.

8. Separation apparatus according to claim 4 wherein said fluid inlet opens into said upper section.

9. Separation apparatus according to claim 8 wherein said tank has a lowermost part, and
a drain outlet opening into said lowermost part of said tank.

10. Separation apparatus according to claim 3, comprising
a plurality of deflector elements respectively disposed in the spaces between said imperforate tubes and said filter elements.

11. Separation apparatus according to claim 10 wherein each of said deflector elements comprises
a helical spacer member disposed in concentric relationship with the imperforate tube in which it is mounted, said helical spacer member being in contact with said imperforate tube and the associated filter element substantially throughout the length of said helical spacer member.

12. Separation apparatus according to claim 3 wherein said vibratory means comprises
a vibratory impactor disposed externally of said tank,
an opening in said tank,
an imperforate diaphragm sealably mounted to said tank over said opening, and
rigid means extending through said diaphragm and sealed thereto,
said rigid means being fixedly mounted to said impactor externally of said tank and being fixedly mounted to said manifold internally of said tank.

13. Separation apparatus according to claim 12 comprising means for providing a sealed chamber on the external side of said diaphragm, and means for applying a pressure to said sealed chamber equal to the pressure on the internal side of said diaphragm.

14. A method of separating only those particulates which are larger than a predetermined size from a fluid in which particulates ranging in size from smaller to larger than said predetermined size are entrained, comprising the steps of providing a porous tubular filter medium having an inner surface and an outer surface and having a pore size through which only particulates having a size no larger than said predetermined size can pass from said outer surface to said inner surface, positioning a substantially imperforate tube which is open at both ends in concentric spaced relationship with said outer surface to provide an annular space between said outer surface and said imperforate tube flowing said fluid into one end of said annular space between said tube and said outer surface and across said outer surface of said filter medium in a direction transverse to said outer surface of said filter medium while continuously vibrating said filter medium to prevent said particulates which are larger then said predetermined size from forming a filter cake across said outer surface of said filter medium, and recirculating fluid from the other end of said annular space to said one end of said annular space, whereby said particulates which are smaller than said predetermined size are not impeded from passing through said filter medium by said larger particulates.

15. A method of separating only those particulates which are larger than a predetermined size from a fluid in which particulates ranging in size from smaller to larger than said predetermined size are entrained, comprising the steps of providing a porous filter element having a pore size through which only particulates having a size no larger than said predetermined size can pass, providing a tubular imperforate member spaced from and in proximity to said porous filter element, providing a helical spacer element positoned between said filter element and said imperforate member in contact with said filter element and said imperforate member, and flowing said fluid across one surface of said filter element in a direction transverse to said one surface of said filter element while continuously vibrating said filter element to prevent said particulates which are larger than said predetermined size from forming a filter cake across said one surface of said filter element, whereby said particulates which are smaller than said predetermined size are not impeded from passing through said filter medium by said larger particulates.

16. Separation apparatus, comprising in combination:

a generally tubular housing having a cylindrical inner wall, a tubular, perforate filter element concentrically disposed in said housing in spaced relationship with said inner wall, said filter element having a pore size through which particulates having a size no greater than said predetermined size can pass, a helical spacer element positioned in the space between said filter element and said inner wall with the outer surface of the turns of said spacer element engaging said inner wall and the inner surface of said turns of said spacer element engaging said filter element to define a helical passageway between said filter element and said inner wall, means for directing a flow of fluid and entrained particulates into one end of said passageway to cause said fluid to travel in a helical path as it flows across the outer surface of said filter element, and means for continuously vibrating said separation element while said fluid and entrained particles flow through said helical passageway.

* * * * *